United States Patent [19]
Hermann

[11] Patent Number: 5,305,895
[45] Date of Patent: Apr. 26, 1994

[54] METHOD AND DEVICE FOR MEASURING A DIMENSION OF A BODY, AND USE OF SAID METHOD

[75] Inventor: Zwahlen Hermann, Wiler, Switzerland

[73] Assignee: Samro-Bystronic Maschinen AG, Switzerland

[21] Appl. No.: 830,740

[22] Filed: Feb. 4, 1992

[30] Foreign Application Priority Data

Feb. 13, 1991 [CH] Switzerland ............... 00445/91-8

[51] Int. Cl.$^5$ ............................................. B07C 5/10
[52] U.S. Cl. ............................ 209/586; 356/376; 250/223 R; 250/560; 209/587; 209/598
[58] Field of Search ............... 209/576, 577, 586, 587, 209/598, 638, 639, 657; 356/376, 371, 385; 250/223 R, 560, 563, 237 G

[56] References Cited

U.S. PATENT DOCUMENTS

| | | | |
|---|---|---|---|
| 3,356,211 | 12/1967 | Mathews | 209/639 X |
| 3,515,254 | 6/1970 | Gary | 198/502.2 |
| 3,814,521 | 6/1974 | Free | 356/376 |
| 4,188,544 | 2/1980 | Chasson | 250/223 R X |
| 4,351,437 | 9/1982 | Long | 209/586 X |
| 4,413,180 | 11/1983 | Libby | 250/236 |
| 4,636,648 | 1/1987 | Egami et al. | 250/566 X |
| 4,929,843* | 5/1990 | Chmielewski, Jr. et al. | 356/376 |
| 5,013,927 | 5/1991 | Tsikos et al. | 356/376 X |

FOREIGN PATENT DOCUMENTS

0335035 10/1989 European Pat. Off. .......... 356/376
0697192 11/1979 U.S.S.R. .......................... 209/639

OTHER PUBLICATIONS

Sensors and Actuators, vol. 17, No. 1-2, 3. May 1989, Lausanne, Switzerland, M. Stuivinga et al. "Range-finding camera based on a position-sensitive device array", pp. 255-258.

Applied Optics, vol. 21, No. 24, Dec. 1982, (New York, N.Y.), H. E. Cline et al. "Computer-aide surface reconstruction of interference contours", pp. 4481-4488.

*Primary Examiner*—D. Glenn Dayoan
*Attorney, Agent, or Firm*—Ostrolenk, Faber, Gerb & Soffen

[57] ABSTRACT

The image of a body which is located in a measuring zone is projected by a mirror into a camera having an optoelectric transducer, for instance a row of photodiodes. The stripe pattern is thrown onto the upper side of the body by a light beam which is inclined with respect to the projecting direction, said stripe pattern being imaged together with said body. The shape of the body in the vertical projection is detected by the camera and an associated electronic system, and the elevation of the body is deduced from the position of the stripe pattern thereon. Three dimensions, i.e. the actual size of the body, are thus determined. A sorting device can be controlled according to the detected size.

29 Claims, 3 Drawing Sheets 5,305,895

METHOD AND DEVICE FOR MEASURING A DIMENSION OF A BODY, AND USE OF SAID METHOD

BACKGROUND OF THE INVENTION

The present invention refers to a method for measuring a dimension of a body, the image of said body being projected onto a measuring sensor, and said dimension being detected by electrooptical means. Known measuring methods are limited to the detection of two dimensions at the most, i.e. the measuring sensor is capable of evaluating the two-dimensional image of a body at the most. In many cases, however, it is desirable to detect three dimensions of the body in order to evaluate its size in three dimensions, or its volume and weight, respectively. Such a detection of the actual size is e.g. desired in sorting processes, in particular for sorting fruit and field crops, especially potatoes. The hitherto usual sorting method, wherein potatoes are sized by dropping through square openings of graded sizes, cannot satisfy in so far as particularly slim potatoes are attributed to a given size although they may under given circumstances have the double volume of spherical potatoes in the same size class. However, the detection of three dimensions of bodies has been complicated and in certain cases impossible even under increased expenditure.

SUMMARY OF THE INVENTION

The present invention is now based on the object of detecting three dimensions of a body without any substantial increase of expenditure, in particular with a single optoelectric sensor; the degree of evaluation of the detected data is merely a question of the amount of electronics and software used. This object is attained by means of a method for measuring the dimension of a body wherein the projection of said image is effected in the direction of the dimension to be measured, and said body is illuminated with an optical pattern in a direction which is inclined with respect to said projecting direction, the dimension being deduced from the position of said pattern on said body. The dimensions which are perpendicular to said projecting direction can be detected by one and the same sensor in a manner known per se and are evaluated by the associated electronics.

The invention also refers to an application of the method wherein the extension of bodies is detected in three dimensions by means of a common image and of a common measuring sensor, and said bodies are sorted according to their size. Finally, the invention also refers to a device for implementing said method, comprising a projecting optics and an optoelectric measuring sensor as well as a device for illuminating a body with an optical pattern, the projecting direction being inclined with respect to the illuminating direction.

The invention is now explained in more detail with reference to the drawing.

BRIEF DESCRIPTION OF THE DRAWINGS

FIG. 1a is an oblique view of a stripe mask for the device of FIG. 1;

DESCRIPTION OF THE PREFERRED EMBODIMENTS

Figure 1:
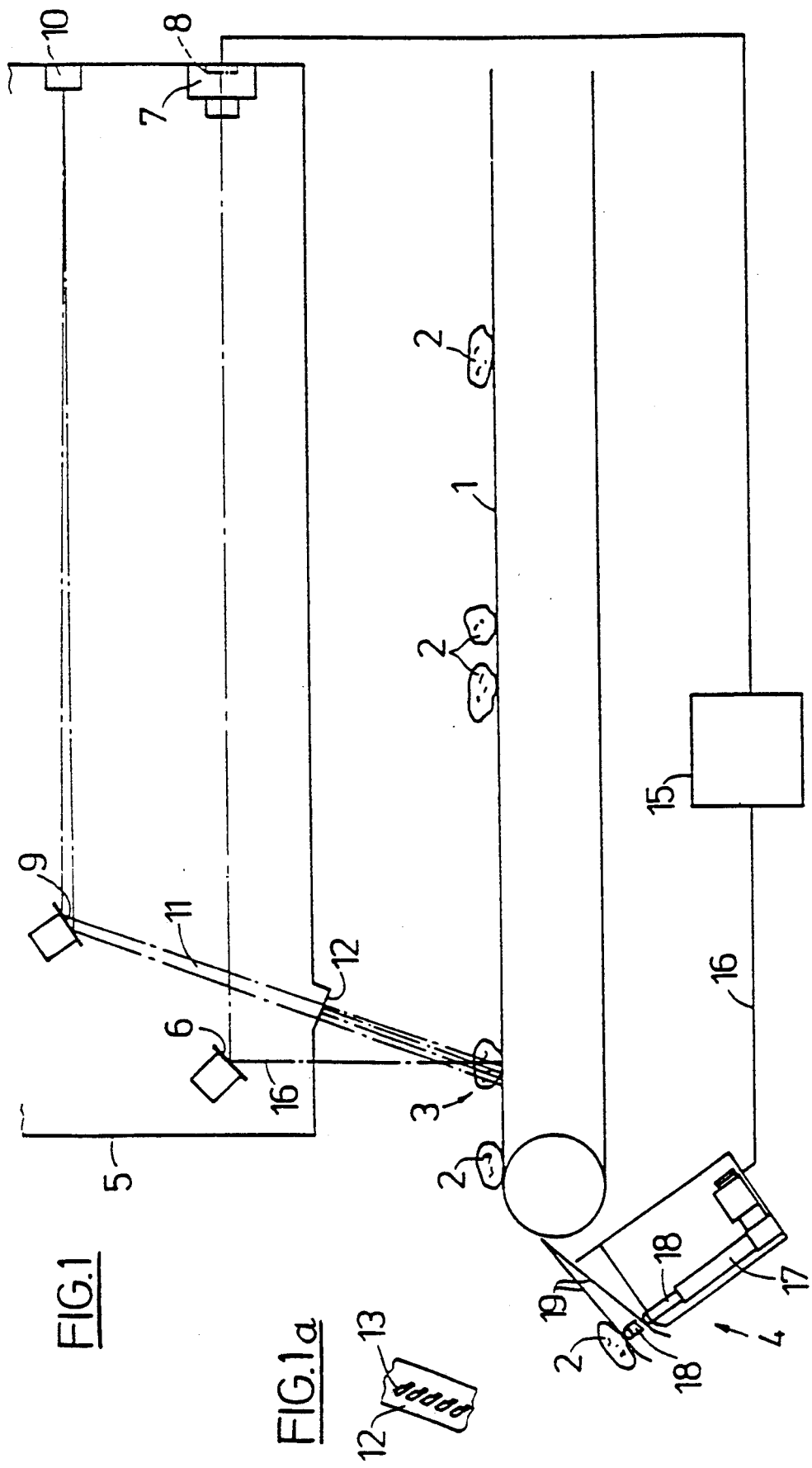
FIG. 1 is a schematical illustration of an embodiment of the device according to the invention.

FIG. 1 schematically shows a device for sorting potatoes. On a conveyor belt 1, potatoes 2 are conveyed from the right to the left through a measuring zone 3 and beyond one end of said conveyor belt to an ejecting device 4. A casing 5 of relatively great length is disposed above conveyor belt 1. Above measuring zone 3, a first mirror 6 is provided in casing 5, through which the image of the measuring zone on the conveyor belt is projected into a camera 7. In camera 7, a row 8 of photodiodes extends in the horizontal direction and serves as an optoelectric sensor. The light values on said photodiodes may be cyclically scanned in a manner known per se, whereby a respective line of the projected measuring zone is surveyed and can be evaluated, or stored for evaluation, as the case may be. Said casing accommodates a second mirror 9 through which a directed light beam 11 from a light source 10 is projected into measuring zone 3. Meanwhile, said light beam passes through a mask 12 which is provided with slit-shaped openings 13. FIG. 1 illustrates only a short section of the elongated mask. In fact, its length approximately corresponds to the width of conveyor belt 1, in such a manner that a pattern of illuminated stripes appears in the measuring zone over the entire conveyor belt area where potatoes are possibly delivered.

Figure 3:
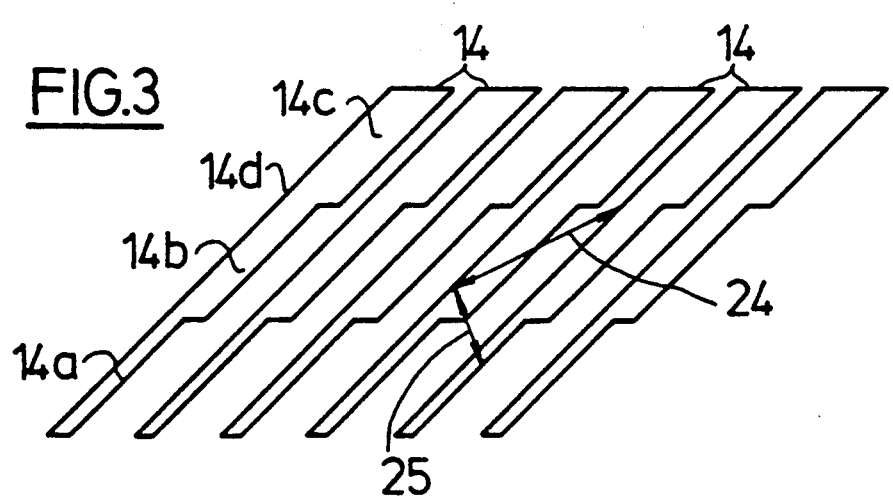
FIG. 3 shows an example of an optical pattern.

A portion of said pattern is represented in more detail in FIG. 3. Each opening 13 of diaphragm 12, i.e. each light stripe 14 on the conveyor belt or on a potato 2 in the measuring zone is stepped and comprises three sections 14a, 14b, and 14c of equal length but increasing width. Moreover, the straight front edges 14d of stripes 14 are inclined by 45° with respect to the longitudinal direction of the stripe pattern, i.e. to the transversal direction of conveyor belt 1. However, a different inclination can be chosen as well. The axis, i.e. the direction of incidence of light beam 11 is inclined by a certain angle of e.g. 20° to 30° with respect to the projecting direction which is identified by optical axis 16 in FIG. 1 and is orthogonal to the conveyor belt. The image of the pattern of light stripes projected onto the conveyor belt, the potatoes in the measuring zone, and the pattern of light stripes appearing on the potatoes are projected into camera 7 and onto sensor 8. Due to the relatively long optical path between the measuring zone on the conveyor belt and camera 7, the entire width of the conveyor belt, i.e. of measuring zone 3 can be projected onto sensor 8.

In a schematical manner, FIG. 1 shows the connection between sensor 8 and the electronic system 15 of the device. Outputs 16 of said electronics are connected to the ejecting device 4 where they act upon valves which control compressed air for ejecting cylinders 17 whose piston rods 18 act upon a respective movably mounted finger 19 each. Ejecting device 4, whose length approximately corresponds to the width of the conveyor belt, is provided with a series of ejecting fingers 19. According to FIG. 1, one of said ejecting fingers has just been lifted up by the associated piston rod 18 in order to eject a potato 2 sliding down over said finger.

Figure 2:
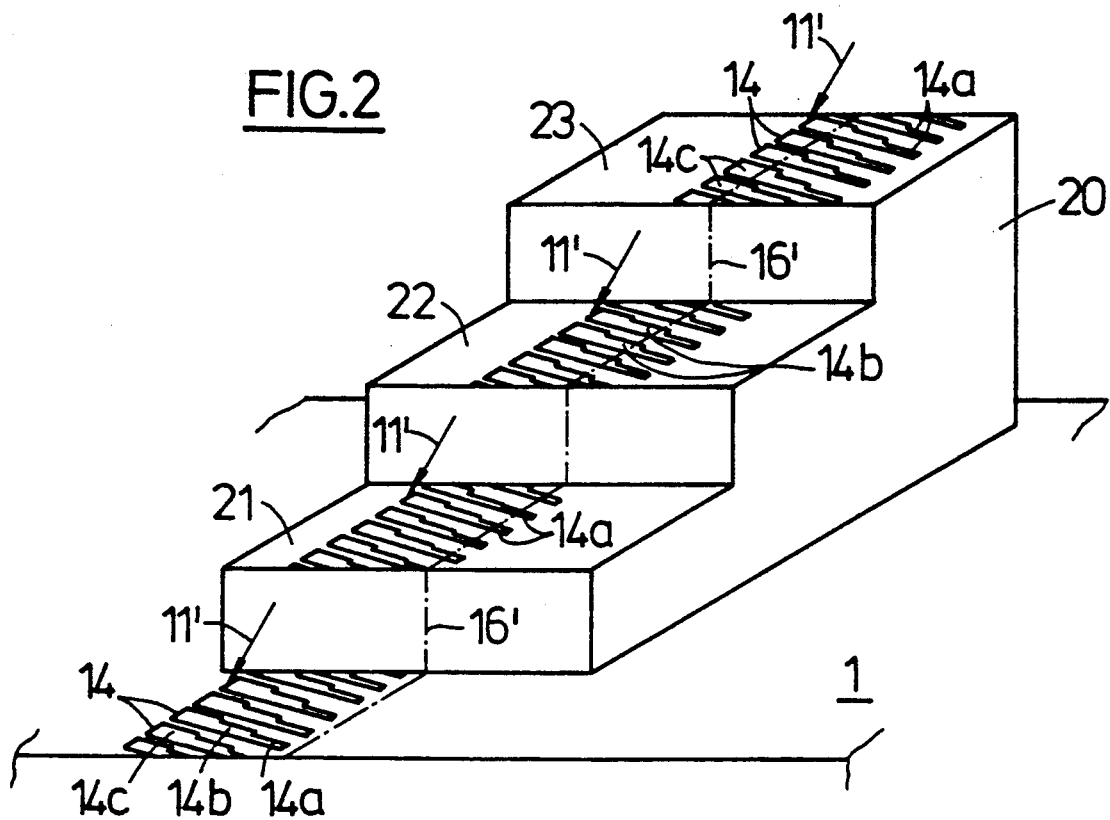
FIG. 2 is a schematical illustration explaining the measuring principle.

As already mentioned, the device represented in FIG. 1 allows a detection of three dimensions and thus of the actual shape and size of the potatoes. The portions of the potatoes which are projected into camera 7 allow a detection of the contours in the vertical projection. The elevation or thickness of the potatoes is detected by means of the described pattern of light stripes. With reference to FIG. 2, the principle of the detection of the elevation is explained by means of a very simple body 20. Due to the inclined incidence of illuminating beam 11, the higher the surface on which the stripe pattern falls, the more said stripe pattern, as seen from above, is displaced towards the right in FIG. 1 or in FIG. 2. On the conveyor belt, i.e. at the elevation 0, said stripes are located so far on the left that they lie completely outside observing plane 16'. This situation corresponds to a level 0. At a next higher lever 21, light stripes 14 are located further to the right, and their narrow sections 14a lie within the area of observing plane 16'. In FIG. 2, arrows 11' indicate the direction of incidence of light beam 11, which is responsible for the transversal displacement of the stripe pattern. At the next higher level 22 of body 20, stripes 14 appear still further displaced to the right, so that now their middle sections 14b lie in the area of observing plane 16'. At the highest level 23, stripes 14 appear still further displaced to the right, so that now their largest sections 14c are located in the area of observing plane 16'. From the position of light stripes 14, i.e. their displacement with respect to the initial position on conveyor belt 1, the elevation of determined portions of a body can be deduced, and there are different possibilities for detecting the amount of said displacement by means of a computer and thus the elevation 44 of a determined point.

Concerning the precise detection of the elevation, FIG. 3 shows that light stripes 14 overlap in the longitudinal direction of the stripe pattern. By scanning the luminous values in the observing plane 16, 16', traversely to conveyor belt 1 by means of sensor 8, the periodical sequence of light and shadow of the bar pattern is detected. Yet, when the bar pattern is laterally displaced on the visible upper side of a potato with respect to the bar pattern on the conveyor belt, as shown in FIG. 2, then the mentioned periodical signal will be phase-shifted by a certain amount corresponding to this elevation as well, and, as shown in FIG. 3, said phase difference can amount to several periods. By means of sections 14a, 14b, and 14c of light stripes 14, the phase difference in integral periods is determined, and by means of the position of front edge 14d, the phase difference within a period. Whether the detection is effected in the area of the narrow sections 14a, of the middle sections 14b, or of the large sections 14c is easily determined by determining either the width of the scanned stripe or the pulse ratio between light and shadow. This arrangement already allows a coarse measure, in the present example in three ranges, or in a greater or smaller number of graduated ranges. Additionally, the precise phase, i.e. the precise time of entry into the illuminated zone during detection can be determined, whence the precise elevation of the body can be determined according to the resolution which is given by the sensor. The precise resolution in this case comprises e.g. eight respective graduations, which is to say that the measuring range is divided into "octaves" which are defined by the stripe sections 14a, 14b, and 14c, and within which again eight values can be detected.

Likewise it is possible to position the narrow ends 14a of stripes 14 in the area of the observing plane 16' at an elevation of 0 already if it is intended to detect even small elevations safely and precisely.

Figure 4:
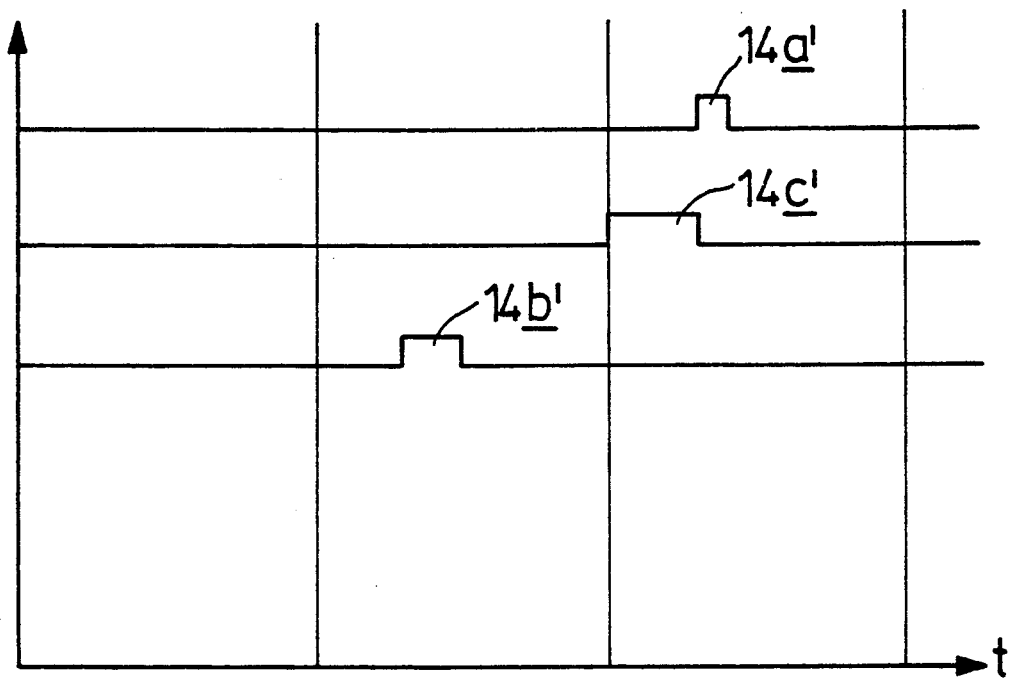
FIG. 4 shows several examples of measuring signals.

FIG. 4 shows an example of a possible occurrence of certain measuring signals. If the detection is effected in the area of a narrow stripe section 14a, an impulse 14a' will appear whose duration corresponds to a unit. The rising edge of said impulse designates the precise position of the stripe. The position of the stripe pattern, i.e. the elevation of the detected portion of a body can be deduced from the impulse duration and from the precise time of the impulse beginning. Another impulse 14c' has a duration of three units and therefore corresponds to a detection in section 14c of the stripe pattern, and again the precise position of the bar pattern or the elevation of the detected spot can be deduced from the time or the phase of the impulse rise. Another impulse 14b' shows a duration of two units and thus corresponds to a middle section 14b of the stripe pattern.

The scanning of the luminous values in diode row 8, i.e. along measuring zone 3 on conveyor belt 1 is effected with a high frequency, so that e.g. at intervals of the order of 1 mm, all potatoes in the measuring zone are monitored. All values detected in the process are stored and afterwards used for evaluation, i.e. in order to determine the shape of each potato in the plan view and the elevation of each detected point of the potato. The greatest detected elevation can then be singled out and used for the classification according to the size of the potato. It is also possible, however, to effect further calculations by means of the microprocessor and to determine the volume and especially the center of gravity of the potato. The determination of the approximate center of gravity (the underside of the potato cannot be monitored) is significant for setting the precise time of ejection by ejecting device 4. According to the classification of each potato, a stronger or a weaker ejecting impulse is produced, or none at all, so that the potatoes are delivered to different locations and are thus sorted. The microprocessor here determines the time and the intensity of the ejecting movement, as well as the ejecting finger or fingers 19 to be actuated, of course. It has been found that the correct detection and storage of the values associated to a determined potato entail no particular problems even if a plurality of potatos are in measuring zone 3 simultaneously. A certain difficulty could arise if two potatoes are directly adjoining in measuring zone 3. In this case, two potatos might be taken for one. This difficulty can be encountered due to the inclination of stripes 14. It is understood that the above-mentioned, considerable phase shifting of the periodical detecting signal occurs when the stripe pattern is traversely displaced, which means that during the displacement, i.e. during the rise to a greater elevation, a frequency variation will occur, namely an increase of the frequency in the case of rising flanks of a body and a decrease of the frequency in the case of falling flanks of a body. Arrows 24 and 25 in FIG. 3 indicate that in the case of a downward displacement of the pattern, i.e. when the elevation is increasing, the temporal distance between the detection of the front edges of the stripes is greater (arrow 24) than in the case of a contrary displacement on the falling flank of the monitored body. It is thus possible in this manner to determine the value and the sense of the inclination of a flank of a body. It is further possible, for example for the monitoring of potatoes, to detect only elevation values occurring in flat places, i.e. where the variation of the frequency resulting from the detection of the stripes is low or zero. Now, if this frequency suddenly jumps from a reduced to an increased value when adjoining potatoes are monitored, it can be deduced that two adjacent potatoes are concerned, and the measuring signals can be stored and processed accordingly.

Figure 5:
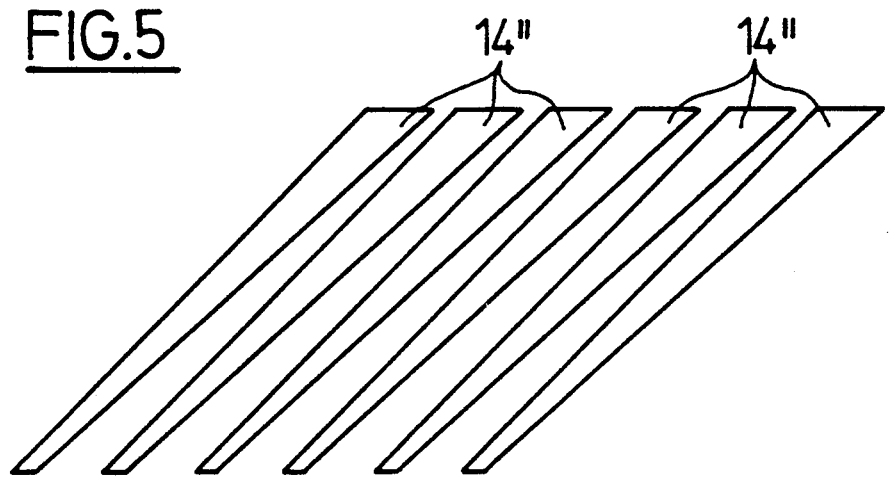
FIG. 5 shows a second example of an optical pattern.

FIG. 5 shows an alternative embodiment of the mask 12, i.e. of the stripe pattern. In this case, stripes 14" are no longer stepped but have a continuously varying width. Here the elevation might be deduced directly from the stripe width, i.e. the pulse ratio of light and shadow at the examined spot. However, it may be advantageous in this case as well to effect first a coarse division into phase differences of integral periods, and within the latter, a fine division, the detected stripe width or the detected pulse ratio of light and shadow determining the phase difference by integral periods, i.e. the "octave", while the fine division is effected by means of the time of entry into a stripe during scanning.

In the case of the stripe pattern according to FIG. 5, an inclination of said stripes is unnecessary if a detection of frequency variations, i.e. of flank inclinations of the body and/or a high resolution is not required.

Although the invention has been explained above with reference to a sorting device for potatoes, it is understood that any kind of bodies can be tested in a corresponding manner, said bodies passing under the measuring device on a conveyor belt or being held in a certain position.

It has been found that it is advantageous to provide a constant background lighting in addition to the stripe illumination described above. Thus it is avoided that the contours of potatoes which are presently in the full shadow of the stripe pattern will be unprecisely monitored.

The described embodiment with immobile optical elements of the measuring device is particularly simple and reliable. However, it would be possible as well to direct the image of the measuring zone to a suitable transducer, e.g. a photodiode, periodically by means of a rotating or oscillating mirror and to evaluate the data of said transducer accordingly.

I claim:

1. A method for measuring a dimension of a body, comprising:

observing the surface of the body in an observation plane parallel to the dimension of the body being measured;

producing a light pattern comprising a series of stripes on the body by projecting light in a stripe pattern toward the body in a projecting direction inclined from the observation plane, and forming each of the stripes to have at least a first, second and third edge, with the stripes arranged parallel, the light being so directed at the body that the first and second edges of the stripes shining on the body cross the observation plane and the first edges are obliquely inclined from the observation plane;

for the stripes then observable on the body at the observation plane, determining the positions of the intersections of the observation plane with the first and second edges of the stripes by registering the projections of the intersections on a projection line lying in the observation plane, wherein the intersections of the first and second edges are respectively represented by alternating dark to light and light to dark transitions; and calculating the dimension of the body to be measured at each stripe using the determined positions of the intersections of the first and second edges with the observation plane.

2. The method of claim 1, further comprising producing the light pattern of stripes by passing the light through a stripe mask in the projecting direction wherein the stripe mask includes apertures that produce the stripes.

3. The method of claim 1, wherein determining the positions of the intersections of the observation plane and the first and second edges comprises using an electrooptic means which registers the projection of those intersections on a projection line lying in the observation plane 4. The method of claim 1, further comprising placing the body on a support for establishing a support plane, and the observation plane being vertically oriented to the support plane.

5. The method of claim 1, further comprising performing a reference measurement selectively before or after measuring the object.

6. The method of claim 1, wherein the determining of the positions of the intersections comprises sequentially scanning a predetermined length of the light pattern in the observation plane at one time for producing an electric signal varying over time so that a variation in the signal corresponds to a light intensity transition representing either a first or a second edge.

7. The method of claim 1, further comprising measuring the shift of the first edges with respect to a predetermined reference position for calculating the dimension to be measured.

8. The method of claim 7, further comprising performing a reference measurement of the first edges before or after measuring the object to determine the reference position of the first edges.

9. The method of claim 7, wherein the calculating of the dimension to be measured comprises determining the distance between neighboring first and second edges.

10. The method of claim 1, wherein the calculating of the dimension to be measured comprises determining the distance between neighboring first and second edges.

11. The method of claim 10, wherein the first and second edges of the stripes are inclined centrally in the same direction with reference to the observation plane and the stripes are arranged as to overlap;

calculating the dimension to be measured comprises coarsely determining of the value of the dimension from the distance between pairs of adjacent first and second edges and precisely determining the value of the dimension from the shift of one of the first and second edges with respect to a predetermined reference position.

12. The method of claim 11, further comprising performing a reference measurement before or after measuring the object to determine the reference position of the respective one of the first and second edges whose reference position is compared with the actual position of the first or second edge.

13. The method of claim 11, wherein over the length of each stripe in the direction across the observation plane, the distance between the first and second edges varies; and calculating the dimension comprises measuring the distance between the first and second edges and relating that to a dimension in the observation plane.

14. The method of claim 11, wherein the second edges are stepped with respect to the distance from the first edge, each step corresponding to a particular range of values of the dimension.

15. The method of claim 1, wherein over the length of each stripe in the direction across the observation plane, the distance between the first and second edges varies and calculating the dimension comprises measuring the distance between the first and second edges and relating that to a dimension in the observation plane.

16. The method of claim 1, comprising the further step of moving the object through the observation plane and projecting a pattern of uniform, parallel, equidistant stripes on the body;

the calculating step comprising detecting a change in the dimension of the stripes for detecting a change in the dimension of the body by the virtual change in the distance between the first and second edges.

17. The method of claim 1, further comprising moving the object through the observation plane, the calculating step comprising determining a multiplicity of values of the measured dimension of the surface profile in the observation plane and gathering the measured surface profile values for calculating a three dimensional image of the body.

18. The method of claim 1, further comprising determining the variation of the spacing of the positions between the first and/or second edges for determining the direction of incline of the surface of the body being measured.

19. The method of claim 17, further comprising sorting the bodies after they pass the observation plane according to the body dimensions determined by the calculating.

20. The method of claim 1, further comprising sorting the bodies after passing the observation plane according to the body dimensions determined by the calculating.

21. The method of claim 20, wherein the dimensions of each body determines the location of the center of gravity of the body, and adjusting the sorting to sort based on the dimension at the center of gravity of the bodies.

22. The method of claim 20, further comprising ejecting the bodies from a support therefor to different distances according to the measured sizes of the bodies.

23. A device for measuring a dimension of a body comprising:

means supporting the body to be measured at an observation plane;

a light source located out of the observation plane and including means for directing light toward the object at the observation plane;

a mask disposed between the light source and the body to be measured, the mask having a plurality of openings therethrough for passing light selectively to create a stripe pattern on the body;

an essentially linear electrooptic sensor; optical means located in the observation plane for receiving the light reflected off the object in the observation plane and toward the optical means for imaging a line of predetermined length along the observation plane on the sensor.

24. The device of claim 23, wherein the mask openings are shaped so that the stripes have at least opposite first and second edges that respectively define a dark-light and a light-dark transition, the first and second edges of the stripes are inclined generally in the same direction inclined to the observation plane and the stripes are arranged in an overlapping manner.

25. The device of claim 23, wherein the sensor comprises a row of photodiodes.

26. The device of claim 23, wherein the sensor comprises a point sensitive photo sensor and the optical means comprises a scanning optical means comprising light deflecting means for periodically moving the view of the sensor through the observation plane by the scanning optical means.

27. The device of claim 23, wherein the support comprises a conveyor belt on which the bodies are conveyed to move through the observation plane.

28. The device of claim 23, further comprising a sorting device controlled by the sensor for sorting the objects by dimension measured after they are measured.

29. The device of claim 28, wherein the sorting device comprises a row of pivotable ejecting fingers, and means for individually actuating the fingers with controllable intensity for ejecting the bodies to a varying extent depending upon their respective measured dimension.

* * * * *